(12) United States Patent
Ustimenko et al.

(10) Patent No.: US 11,308,099 B2
(45) Date of Patent: Apr. 19, 2022

(54) METHOD OF AND SYSTEM FOR RANKING DIGITAL OBJECTS BASED ON OBJECTIVE CHARACTERISTIC ASSOCIATED THEREWITH

(71) Applicant: YANDEX EUROPE AG, Lucerne (CH)

(72) Inventors: Aleksey Ivanovich Ustimenko, Ivanovo (RU); Aleksandr Leonidovich Vorobyev, p Otradnoye (RU); Gleb Gennadevich Gusev, Moscow (RU); Pavel Viktorovich Serdyukov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 37 days.

(21) Appl. No.: 16/898,289

(22) Filed: Jun. 10, 2020

(65) Prior Publication Data

US 2021/0073238 A1 Mar. 11, 2021

(30) Foreign Application Priority Data

Sep. 5, 2019 (RU) .......................... RU2019128014

(51) Int. Cl.
*G06F 16/2457* (2019.01)
*G06Q 30/06* (2012.01)
*G06N 20/00* (2019.01)

(52) U.S. Cl.
CPC ....... *G06F 16/24578* (2019.01); *G06N 20/00* (2019.01); *G06Q 30/0601* (2013.01)

(58) Field of Classification Search
CPC .......................... G06N 20/00; G06F 16/24578
See application file for complete search history.

(56) References Cited

U.S. PATENT DOCUMENTS 7,577,655 B2 8/2009 Curtiss et al.
7,716,225 B1 5/2010 Dean et al.
(Continued)

FOREIGN PATENT DOCUMENTS

RU 2410748 C2 1/2011
RU 2501078 C2 12/2013

OTHER PUBLICATIONS

Russian Search Report dated Jun. 17, 2021 issued in respect of the counterpart Russian Patent Application No. RU 2019128014.

*Primary Examiner* — Hau H Hoang
(74) *Attorney, Agent, or Firm* — BCF LLP

(57) ABSTRACT

A method and system for ranking digital object based on an objective characteristic associated therewith are provided. The method comprising: generating a set of digital objects based on a user request, the set of digital objects being rankable according to an objective characteristic thereof; receiving a filter request from the user, the filter request being based on a secondary characteristic of digital objects in the set of digital objects; determining object parameters for the digital objects in the set of digital objects, a given object parameter being indicative of a likelihood that an inclusion of a respective digital object in a re-ranked set of digital objects will increase a quality metric of the re-ranked set of digital objects; selecting digital objects based on object parameters; ranking digital objects based on respective values of the secondary characteristic, thereby generating the re-ranked set of digital objects.

20 Claims, 8 Drawing Sheets

(56) References Cited

U.S. PATENT DOCUMENTS

| | | |
|---|---|---|
| 8,768,932 B1 | 7/2014 | Kacholia et al. |
| 2005/0060312 A1 | 3/2005 | Curtiss et al. |
| 2017/0185602 A1 | 6/2017 | Gusev et al. |
| 2017/0193138 A1 | 7/2017 | Katsuki et al. |
| 2020/0342320 A1* | 10/2020 | Natesh .............. G06F 16/90335 |

* cited by examiner

200
METHOD OF AND SYSTEM FOR RANKING DIGITAL OBJECTS BASED ON OBJECTIVE CHARACTERISTIC ASSOCIATED THEREWITH

CROSS-REFERENCE

The present application claims priority to Russian Patent Application No. 2019128014, entitled "Method of and System for Ranking Digital Objects Based on Objective Characteristic Associated Therewith", filed Sep. 5, 2019, the entirety of which is incorporated herein by reference.

FIELD

The present technology relates to methods and systems of ranking digital objects, in general, and a method of a system for ranking digital objects based on an objective characteristic associated therewith, in particular.

BACKGROUND

The Internet provides access to a wide variety of resources, for example, video files, image files, audio files, or Web pages. Search engines are used to search these resources. Amongst users of the Internet, are also popular so-called digital object services that are designed for searching for digital objects on specific web platforms. Non-limiting examples of such digital object services may include product search engines (also, referred to herein as "commercial search systems") used on e-commerce platforms (such as Amazon™ e-commerce platform, eBay™ e-commerce platform, and the like) for searching for and buying various goods supplied by a plethora of sellers; or digital object services used in social networks (for example, Facebook social network) for searching for particular events, people, or posts.

Similarly to conventional search engines (such as GOOGLE™ search engine, Yahoo!™ search engine, Baidu™ search engine, and the like), the user may indicate his or her intent to search for a particular digital object (for example, a particular product) by providing a corresponding search request to the digital object services and submitting it. In response to the user's search request, the digital object service identifies digital objects (for example, offers from different sellers) that satisfy the user's request, ranks them based on their relevance to the user's request (referred to herein as ranking based on the "objective characteristic"), and finally, selects several top digital objects from the ranked plurality for presenting a set thereof to the user on the screen of a user device.

The functionality of those digital object services allows not only for providing the plurality of digital objects ranked based on their relevance to the search request submitted by the user, but also, generally, allows filtering the presented ranked plurality according to a user-selected attribute (also, referred to herein as ranking or filtering based on "secondary characteristics") of the digital objects. Continuing with the example given above regarding the product search engines, a secondary characteristic may be a price of digital objects allowing the user to order the ranked plurality of offers in an ascending order, whereby the user may choose a best price offer.

US Patent Publication No.: 2017/185,602-A1 (published on Jun. 29, 2017 and assigned to Yandex Europe AG) discloses methods and systems for generating a search engine results page (SERP). The method is executable at a server executing a search engine, the server being accessible via a communication network by at least one electronic device. The method comprises, as part of generating a search result list, the search result list containing a first search result and a second search result, predicting a first interest parameter for the first search result; predicting a second interest parameter for the second search result; predicting a usefulness parameter for the first search result, the predicting being at least partially based on the first interest parameter and the second interest parameter; adjusting a position of the first search result within the ranked search result list based on the predicted usefulness parameter, the adjusting resulting in the first search result being at an adjusted position within the ranked search result list.

U.S. Pat. No. 8,768,932-B1 (published on Jul. 1, 2014 and assigned to Google LLC) discloses a system for ranking search-results. During operation, the system receives a query, wherein the query includes one or more terms. The system subsequently searches a dataset using the one or more terms to obtain search-results. Next, the system receives an attribute-identifier, which identifies an attribute for the obtained search-results. Then, for each search-result, the system calculates a combined score based on an attribute-value for the identified attribute, and a relevance-score for the search-result. The system then ranks the search-results based on combined scores associated with the search-results. Finally, the system presents the ranked search-results to a user.

U.S. Pat. No. 7,577,655-B2 (published on Aug. 18, 2009 and assigned to Google LLC) discloses a system for ranking results. The system may receive a list of links. The system may identify a source with which each of the links is associated and rank the list of links based at least in part on a quality of the identified sources.

SUMMARY

Developers of the present technology have appreciated certain technical drawbacks associated with the existing e-commerce based search engines. More specifically, certain shortcomings associated with methods of selecting digital objects for a re-ranked set of digital objects have been noted.

More specifically, filtering by the dedicated attribute may result in the user being provided with a re-ordered plurality of digital objects, where top results in the set of digital objects are significantly less relevant to the user's request than the top results provided before filtering, that is the search results ranked based on their objective characteristic. Accordingly, such filtering may cause an overall ranking quality metric of the set of digital objects to be comparatively low. This, in turn, may be indicative of user's dissatisfaction of their experience of interacting with the digital object services as time and effort increase for user to find a digital object having not only a relevant secondary characteristic, but also being relatively highly raked according to its objective characteristic (i.e. being relevant to the user's search intent).

For example, let's consider a scenario where the user would like to buy an iPhone™ X smartphone using one of e-commerce platforms. To that end, the user may provide a corresponding user's search request "iPhone X" to a digital object service used therein. The digital object service then provides the user with a ranked set of offers based on their relevance to the inputted user's request. The user may be interested to buy an iPhone X for the lowest available price. Accordingly, to find the best price offer, the user may use a filter by price available on the digital object service to order the offers in an ascending order (lowest price on top). However, the user may then be provided with a re-ranked set of offers comprising irrelevant, to the user's request, offers (such as iPhone cases, iPhone compatible chargers, etc.) only for the reason that they are typically cheaper than the iPhone.

Therefore, developers of the present technology have devised methods and systems which allow for selecting, from a preliminarily ranked, based on an objective characteristic, set of digital objects, digital objects for including into a re-ranked, based on a secondary characteristic, set of digital objects based on a likelihood that an inclusion of a given digital object would increase a given quality metric of the re-ranked set of digital objects.

To that end, developers of the present technology have developed systems and methods for generating a re-ranked set of digital objects that has been re-ranked according to a secondary characteristic, however comprising digital objects that are relevant to the user's request, which results in an increased quality and usefulness of such a set to the user.

In accordance with a first broad aspect of the present technology, there is provided a method for ranking digital objects based on an objective characteristic associated therewith. The ranking is executed in response to a request received from an electronic device associated with a user. The method is executable by a server communicatively accessible by the electronic device via a communication network. The method comprises: based on the request, selecting a set of digital objects from a pool of digital objects, the set of digital objects being relevant to the request based on the objective characteristic of the digital objects, the set of digital objects being rankable in accordance with the objective characteristic thereof; receiving, from the electronic device, a filter request for a re-ranked set of digital objects from the set of digital objects, the filter request being based on a secondary characteristic that is different from the objective characteristic; selecting digital objects to be included in the re-ranked set of digital objects by: determining, for a given digital object of the set of digital objects, a respective object parameter indicative of a likelihood that an inclusion of the given digital object in the re-ranked set of digital objects would increase a quality metric of the re-ranked set of digital objects considering the objective characteristic of the digital objects; selecting digital objects based on the respective object parameters; and ranking the re-ranked set of digital objects based on the respective values of secondary characteristic, thereby generating the re-ranked set of digital objects having the selected digital objects ranked in accordance with the secondary characteristic.

In some implementations of the method, the objective characteristic is indicative of relevance of the given digital object to the request.

In some implementations of the method, the secondary characteristic is not indicative of relevance of the given digital object to the request.

In some implementations of the method, the secondary characteristic is indicative of a relative value parameter of the given digital object relative to an other one of the set of digital objects.

In some implementations of the method, the secondary characteristic enables ranking digital objects in accordance with the secondary characteristic, which ranking is different from a ranking based on the objective characteristic.

In some implementations of the method, the secondary characteristic is indicative of an inherent parameter of the given digital object and the other one of the set of digital objects.

In some implementations of the method, the inherent parameter is not directly indicative of the relevance of the given digital object to the request.

In some implementations of the method, the method further comprises training the MLA.

In some implementations of the method, the training the MLA comprises feeding the MLA a set of training digital objects, each of the set of training digital objects including: (i) a training digital object that is part of a training set of digital objects; (ii) a training request that was used to generate the training set of digital objects, (iii) an indication of a secondary characteristic of the training digital object; and (iv) an assessor-generated label indicative of whether the training digital object should be included in a sub-set of training digital objects considering the secondary characteristic and relevance of the training digital object to the training request.

In some implementations of the method, the MLA is a gradient boosted decision tree based MLA.

In some implementations of the method, the re-ranked set of digital objects has fewer digital objects than the set of digital objects.

In some implementations of the method, the object parameter is based on a trade-off between a number of digital objects to be included in the re-ranked set of digital objects and relevance of included digital objects of the re-ranked set of digital objects.

In some implementations of the method, the trade-off is for a sub-set of higher ranked positions of the re-ranked set of digital objects.

In some implementations of the method, the sub-set of higher ranked positions is a top-N number of positions of the re-ranked set of digital objects.

In some implementations of the method, the quality metric is based on a relevancy of the re-ranked set of digital objects to the request based on the objective characteristic.

In some implementations of the method, the quality metric is based on a predicted value of the secondary characteristic of top N-digital objects of the re-ranked set of digital objects.

In a second broad aspect of the present technology, there is provided a system for ranking digital objects based on an objective characteristic associated therewith. The system comprises a hardware server coupled, via a communication network, to an electronic device associated with a user. The hardware server is configured to receive, from the electronic device, a request for ranking digital objects; select, based on the request, a set of digital objects from a pool of digital objects, the set of digital objects being relevant to the request based on the objective characteristic of the digital objects, the set of digital objects being rankable in accordance with the objective characteristic thereof; receive, from the electronic device, a filter request for a re-ranked set of digital objects from the set of digital objects, the filter request being based on a secondary characteristic that is different from the objective characteristic; select digital objects to be included in the re-ranked set of digital objects by: determine, for a given digital object of the set of digital objects, a respective object parameter indicative of a likelihood that an inclusion of the given digital object in the re-ranked set of digital objects would increase a quality metric of the re-ranked set of digital objects considering the objective characteristic of the digital objects; select digital objects based on the respective object parameters; and rank the re-ranked set of digital objects based on the respective values of secondary characteristic, thereby generating the re-ranked set of digital objects having the selected digital objects ranked in accordance with the secondary characteristic.

In some implementations of the system, the hardware server is further configured to determine the object parameter using an MLA.

In some implementations of the system, the hardware server is further configured to train the MLA by feeding the MLA a set of training digital objects. Each of the set of training digital objects includes: (i) a training digital object that is part of a training set of digital objects; (ii) a training request that was used to generate the training set of digital objects, (iii) an indication of a secondary characteristic of the training digital object; and (iv) an assessor-generated label indicative of whether the training digital object should be included in a sub-set of training digital objects considering the secondary characteristic and relevance of the training digital object to the training request.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present technology, a "native application" is a software program that has been specifically developed for use on a particular device and its operating system.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Appendices A and B are provided at the end of the present specification. The Appendix A includes a copy of a yet to be published article entitled "Learning to Select for a Predefined Ranking". The Appendix B includes a copy of a yet to be published article entitled "Supplementary Material for Learning to Select for a Predefined Ranking". These articles provide additional background information, description of implementations of the non-limiting embodiments of the present technology, as well as some additional examples. The entirety of these articles is incorporated herein by reference in their entirety, in all those jurisdictions where such incorporation by reference is allowed.

DETAILED DESCRIPTION

Figure 1:
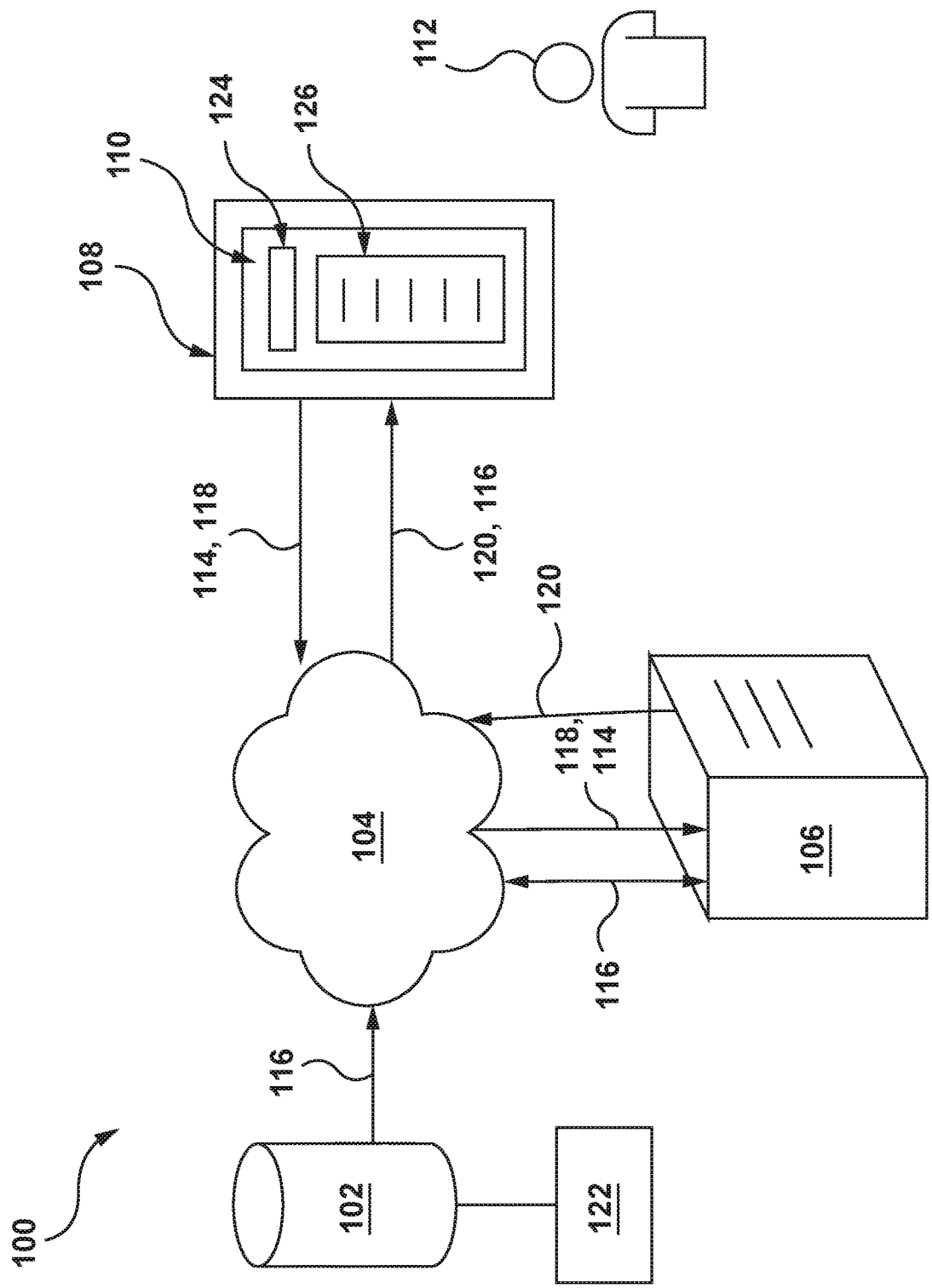
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Electronic Device

The system 100 comprises an electronic device 108, the electronic device 108 being associated with a user 112. As such, the electronic device 108 can sometimes be referred to as a "client device", "end user device", "client electronic device" or simply "device". It should be noted that the fact that the electronic device 108 is associated with the user 112 does not need to suggest or imply any mode of operation—such as a need to log in, a need to be registered, or the like.

The implementation of the electronic device 108 is not particularly limited, but as an example, the electronic device 108 may be implemented as a personal computer (desktops, laptops, netbooks, etc.), a wireless communication device (such as a smartphone, a cell phone, a tablet and the like), as well as network equipment (such as routers, switches, and gateways). The electronic device 108 comprises hardware and/or software and/or firmware (or a combination thereof), as is known in the art, to execute a given browser application. Generally speaking, the purpose of the given browser application is to enable the user 112 to access one or more web resources. How the given browser application is implemented is not particularly limited. One example of the given browser application may be embodied as a Yandex™ browser.

In some embodiments of the present technology, the given browser application implemented by the electronic device 108 may allow the user 112 to submit user requests to a digital object service 110 (for example, hosted by a server 106). The digital object service 110, when accessed by the electronic device 108, comprises a search interface 124 that can be implemented as an "omnibox" allowing the user 112 entry/submission of user requests, and a results display portion 126 for displaying sets of digital objects that are responsive to a submitted user request of the user 112. Generally speaking, the digital object service 110 is a system configured to receive user requests from plurality of users, select digital objects from a pool of digital objects 122 responsive to the received user requests to generate corresponding sets of digital objects, and provide corresponding sets of digital objects to the electronic device 108 pp of to the user 112. Some examples of the digital object service 110 may include e-commerce platforms (such as Amazon™ e-commerce platform, eBay™ e-commerce platform, Yandex Market e-commerce platform and the like) and social network websites (such as Facebook™ social network website, VK™ social network website, and the like).

For example, the user 112 may use the browser application (not depicted) to access the digital object service 110 using the electronic device 108 to submit a user request. In response thereto, the electronic device 108 generates a data-packet 114 comprising data indicative of the user request of the user 112. It is contemplated that a plurality of data-packets may be generated by a plurality of devices of the system 100 similarly to how the electronic device 108 is configured to generate the data-packet 114 based on the associated user request inputted/submitted by a respective user (not depicted) into an associated browser application.

In the non-limiting embodiments of the present technology, instead of using the browser application to access the digital object service 110, the user 112 may access the digital object service 110 via a native application associated therewith and with the electronic device 108.

Communication Network

The electronic device 108 is communicatively coupled to the communication network 104 for accessing the digital object service 110 of the server 106. In some non-limiting embodiments of the present technology, the communication network 104 can be implemented as the Internet. In other non-limiting embodiments of the present technology, the communication network 104 can be implemented differently, such as any wide-area communication network, local-area communication network, a private communication network and the like. How a communication link (not separately numbered) between the electronic device 108 and the communication network 104 is implemented will depend inter alia on how the electronic device 108 is implemented.

Merely as an example and not as a limitation, in those embodiments of the present technology where the electronic device 108 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 108 is implemented as a notebook computer, the communication link can be either wireless (such as Wireless Fidelity, or WiFi® for short, Bluetooth® or the like) or wired (such as an Ethernet based connection).

The communication network 104 is configured to transmit inter alia the data-packet 114 from the electronic device 108 to the server 106 and a data-packet 116 indicative of a set of digital objects from the server 106 to the electronic device 108. For example, the set of digital objects may comprise digital objects selected by the server 106 from the pool of digital objects 122 (stored, for example, in a database 102) and that are responsive to the user request of the user 112. How the server 106 is configured to generate the data-packet 116 indicative of the set of digital objects and present it in the results display portion 126 for presenting to the user 112 on the electronic device 108 will be further described below in greater detail.

Server

The system 100 also comprises the server 106 that can be implemented as a conventional computer server. In an example of an embodiment of the present technology, the server 106 can be implemented as a Dell™ PowerEdge™ Server running the Microsoft™ Windows Server™ operating system. Needless to say, the server 106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Generally speaking, the server 106 can be under control and/or management of the digital object service 110 (e.g., Yandex™ Market), as previously mentioned. As such, the server 106 may be configured to execute one or more digital object searches responsive to user requests submitted by users of the digital object service 110.

The server 106 is configured to execute at least some of the plurality of computer-implemented procedures, which will be described further below with reference to FIGS. 2 and 3. It should be understood that the server 106 may also execute additional computer-implemented procedures to those non-exhaustively depicted in FIGS. 2 and 3.

Database

In the non-limiting embodiments of the present technology, the system 100 may also comprise the database 102 communicatively coupled to the server 106 via the communication network 104 and is configured to store the pool of digital objects 122 and information extracted or otherwise determined or generated by the server 106.

Although, in the embodiments of FIG. 1, the database 102 is depicted as a distinct server communicatively coupled to the server 106 via the communication network 104, it is to be noted that, in the non-limiting embodiments of the present technology, the database 102 may also be part of the server 106 (e.g., stored in the memory of server 106 such as the solid-state drive and/or the random access memory, not separately depicted).

Generally speaking, the database 102 may be configured to store the pool of digital objects 122. The pool of digital objects 122 comprises an indication of digital objects associated with the digital object service 110. In the non-limiting embodiments of the present technology, the digital objects represent digital documents of various types including, but not being limited to, text documents, audio and video documents, and any other types of digital documents created using various software, or a combination thereof. Also, these documents may be of any known corresponding format. Broadly speaking, digital objects, as referred to herein, represent electronic media content entities that are suitable for being transmitted, received, stored, and displayed.

For example, in some non-limiting embodiments of the present technology where the digital object service 110 is an e-commerce web platform, the digital objects may be offers of various products. As an example, a given digital object may represent a web page comprising a plurality of digital entities, each one of which representing a separate digital object of a specific format, the separate digital object being representative of a product for sale.

In other non-limiting embodiments of the present technology where the digital object service 110 is a social network website, the digital objects may be, for example, posts generated by users of the social network website, news items, publications, a given one of which comprising at least one of text information, audio and video information, etc.

In the non-limiting embodiments of the present technology, the database 102 may receive data from the server 106. The data may have been extracted or otherwise determined or generated by the server 106 during processing for temporary and/or permanent storage thereof. It is contemplated that the database 102 may be split into several distributed databases without departing from the scope of the present technology.

In the non-limiting embodiments of the present technology, the database 102 is configured to store, along with the digital objects of the pool of digital objects 122, auxiliary data associated with each of the pool of digital objects 122. This data may be extracted (generated) and transmitted to the database 102 by the server 106.

In the non-limiting embodiments of the present technology, this data associated with the digital objects comprise past user interactions data therewith and secondary characteristics thereof.

Generally speaking, the past user interactions data represents any historical data indicative of user interactions with a given digital object by a plurality of users having submitted a given or similar (to the given one) user requests. It is noted that the indication of past user requests can also be stored in the database 102 in association with the given digital object. In accordance with the non-limiting embodiments of the present technology, the past user interactions data can be used for determining a relevance parameter of the given digital object to one of the user requests.

Non-limiting examples of the past user interactions data that may be generated and maintained by the server 106 include click-through data (CTR) associated with the given digital object that is gathered from the plurality of users that "interacted" with the given digital object following a submission of the given or similar user requests. Further, the past user interaction data may further include click mean reciprocal rank (click MRR), or an inverted position of the first click on the given digital object. Finally, the past user interactions data may include an abandonment rate, that is part of the user requests associated with the given digital objects having received no clicks from any of the plurality of the users.

In the non-limiting embodiments of the present technology, a given digital object in the pool of digital objects 122 has at least one secondary characteristic.

In the non-limiting embodiments of the present technology, the at least one secondary characteristic associated with the given digital object may be indicative of an inherent parameter thereof.

In the non-limiting embodiments of the present technology, the inherent parameter is indicative of a relation of the given digital object to another digital object in at least part of the pool of digital objects 122. In other words, the inherent parameter is a common characteristic of at least part of digital objects in the pool of digital objects 122. In the example where the digital object service 110 is an e-commerce web platform and the given digital object is a product offer, the inherent parameter may be the name of a product, an offer price, a price aggregated over different categories the product belongs to, an offer shipment date, a payment method, and the like.

In the other example where the digital object service 110 is a social network website and the given digital object is, for example, a social network post, the inherent parameter may be time the post was created, or a person having created it.

Accordingly, the at least one secondary characteristic associated with the given digital object of the pool digital of digital objects 122 may not be indicative of a relevance of the given digital object to user requests associated therewith.

Alternatively, the at least one secondary characteristic associated with each digital object of the at least part of the pool of digital objects 122 may be indicative of a relative value parameter of the given digital object to each of the other digital objects from the at least part of the pool of the digital objects 122 based on a respective inherent parameter. In other words, the digital objects of the pool of digital objects 122 can also be ranked based on the relative value therebetween, the relative value being represented by the secondary characteristic associated therewith (such as price, alphabetical order of titles, shipment dates, popularity, user-rankings, and the like).

Accordingly, in the non-limiting embodiments of the present technology, the server 106 is configured to receive the data-packet 114 comprising data indicative of the user request (the receiving being executed in response to submitting, by the user 112 using the electronic device 108, a user request to the search interface 124 of the digital object service 110). Further, the server 106 is configured to select digital objects from the pool of digital objects 122 hosted on the database 102, the digital objects being relevant to the user request, thereby generating the data-packet 116 indicative of digital objects relevant to the inputted user request.

To that end, the server 106 may be configured to generate, for each digital object in the pool of digital objects 122, a ranking parameter based on an objective characteristic. In accordance with the non-limiting embodiments of the present technology, the ranking parameter can be indicative of the relevance of the given digital object to the user request. The ranking parameter can be predicted based on the past user interaction data associated with the digital objects of the pool of digital objects 122. Thus, it can be said, that the objective characteristic of a given digital object is indicative of the relevance of the given digital object to the inputted user request.

How the server 106 generates the ranking parameter based on the objective characteristic is not limited and may include generating the ranking parameter using one or more Machine-Learning Algorithms (MLAs) that have been trained to predict ranking parameters of the digital objects indicative of their relevance to user requests based, inter alia, on past user interaction data associated with the digital objects. How the one or more MLAs are trained and then used in order to predict ranking parameters of digital objects to a given user request is described in a US Patent Publication number US 2017/0185681, entitled "METHOD OF AND SYSTEM FOR PROCESSING A PREFIX ASSOCIATED WITH A SEARCH QUERY", filed on Dec. 1, 2016, content of which is incorporated herein by reference in its entirety and, therefore, will not be described in greater detail herein.

The server 106 is configured to select a set of digital objects based on their respective objective characteristics. As an example, the server 106 may select top 500 digital objects, based on their relevance to the user request.

Having selected digital objects from the pool of the digital objects 122, the server 106 may further be configured to generate the data-packet 116 and may transmit the data-packet 116 indicative of digital objects of the set of digital objects to the electronic device 108 via the communication network 104 for presenting to the user 112 at least part of the set of digital objects in the results display portion 126 of the digital object service 110.

It should be noted that the objective characteristics of the digital objects for the set of digital objects from the pool of digital objects 122 can be suitable for ranking the digital objects, such that the digital objects having higher values of their objective characteristics are placed first in the set of digital objects. In this regard, in the non-limiting embodiments of the present technology, before sending the data-packet 116 indicative of the selected set of digital objects, the server 106 may rank the digital objects in the set according to predicted ranking parameters generated based on respective objective characteristics.

Upon presentation of the at least part of the set of digital objects in the results display portion 126, the user 112 may want to reorder the set of digital objects based on one of secondary characteristics associated therewith.

Turning back to the example where the digital object service 110 is an e-commerce platform, the user 112 may want to reorder the offers based on their price in an ascending order (the lowest price on top).

To that end, the user 112 may use a corresponding actuator or a plurality thereof (not depicted) of the digital object service 110 to choose the one of the secondary characteristics, thereby generating an indication of a filter request 118 for a re-ranked set of digital objects to further send it, via the communication network 104, to the server 106.

Figure 5:
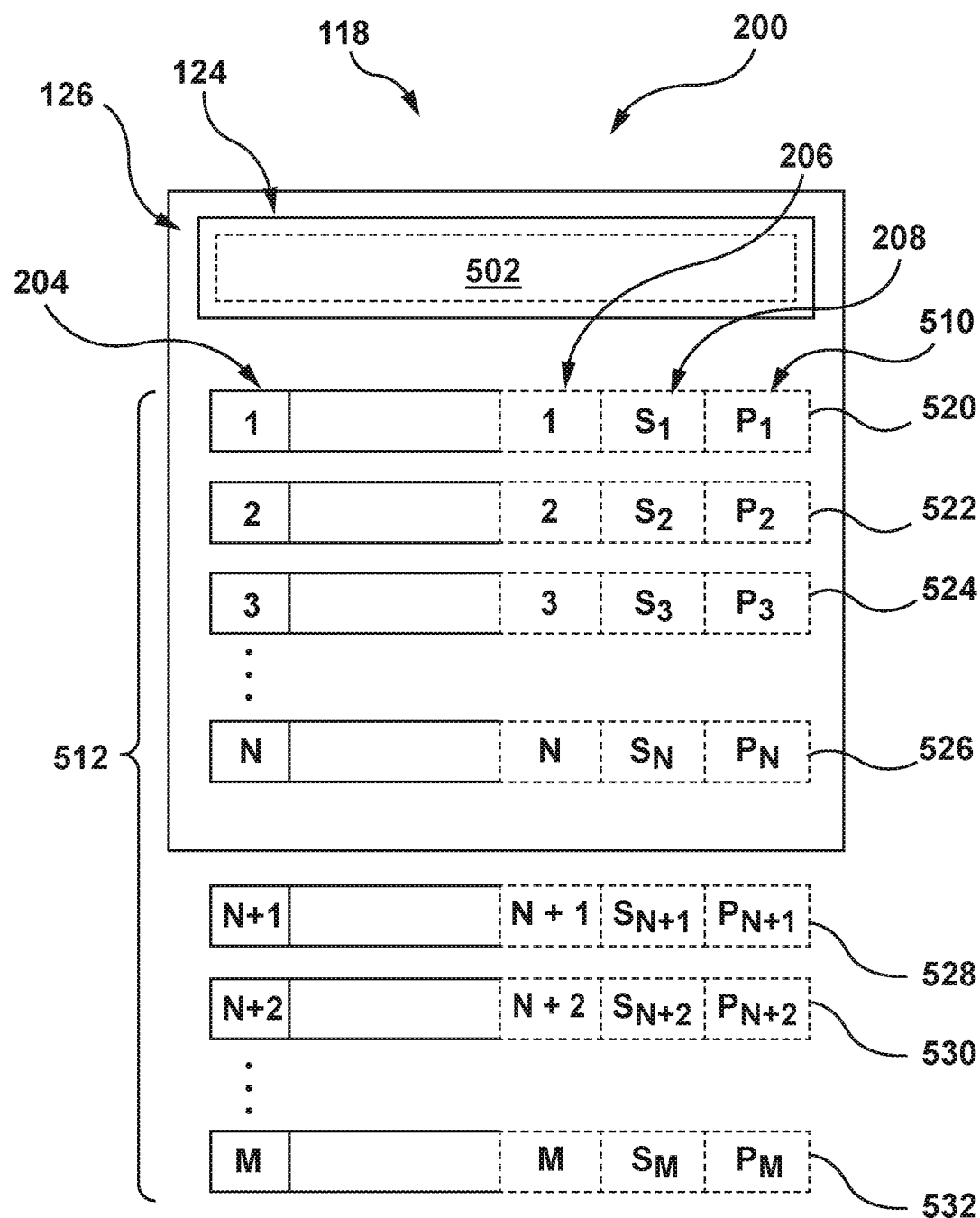
FIGS. 5 to 7 depict an example of an in-use phase of the MLA used in the system of FIG. 1, according to the non-limiting embodiments of the present technology.
Figure 6:
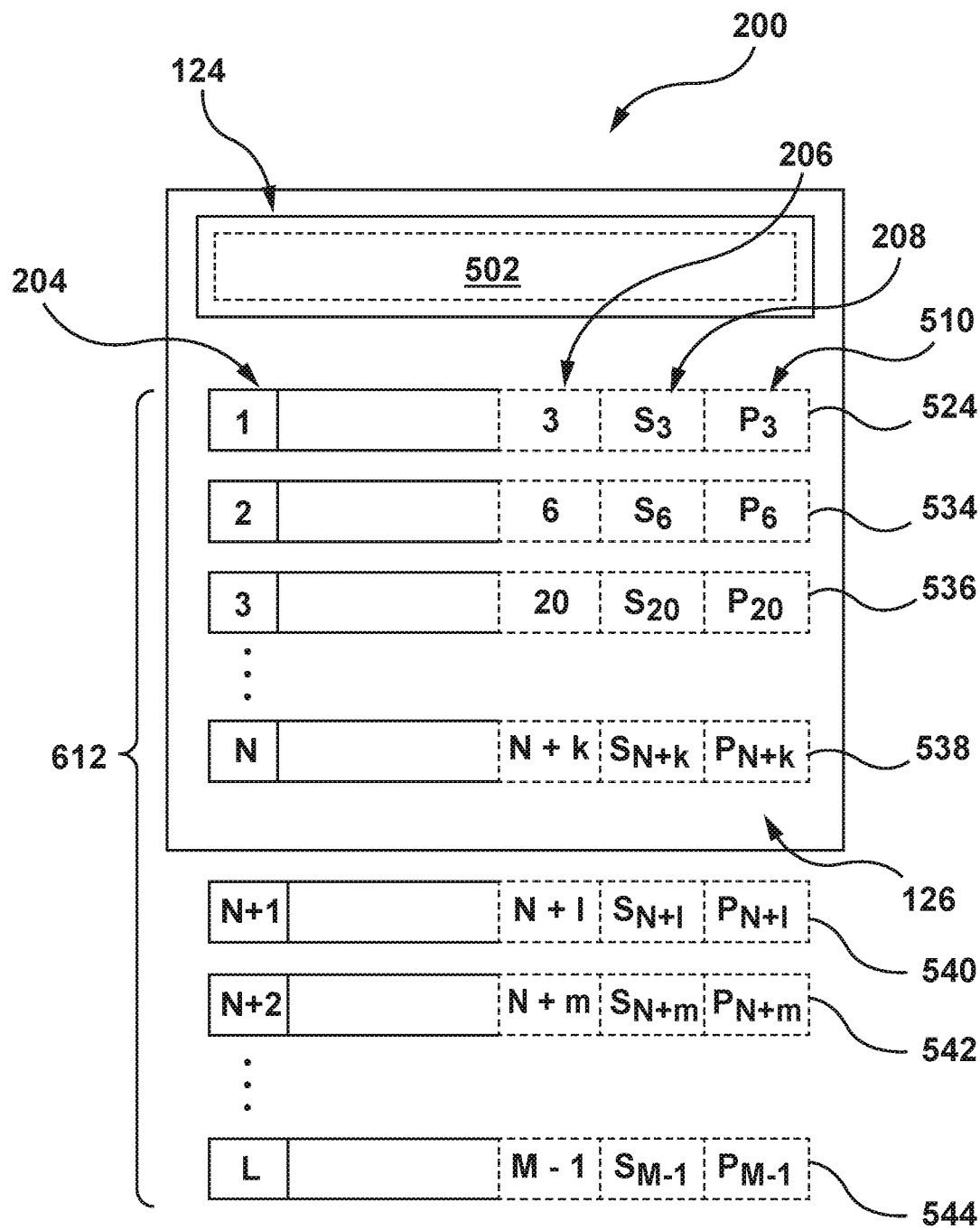
Figure 7:
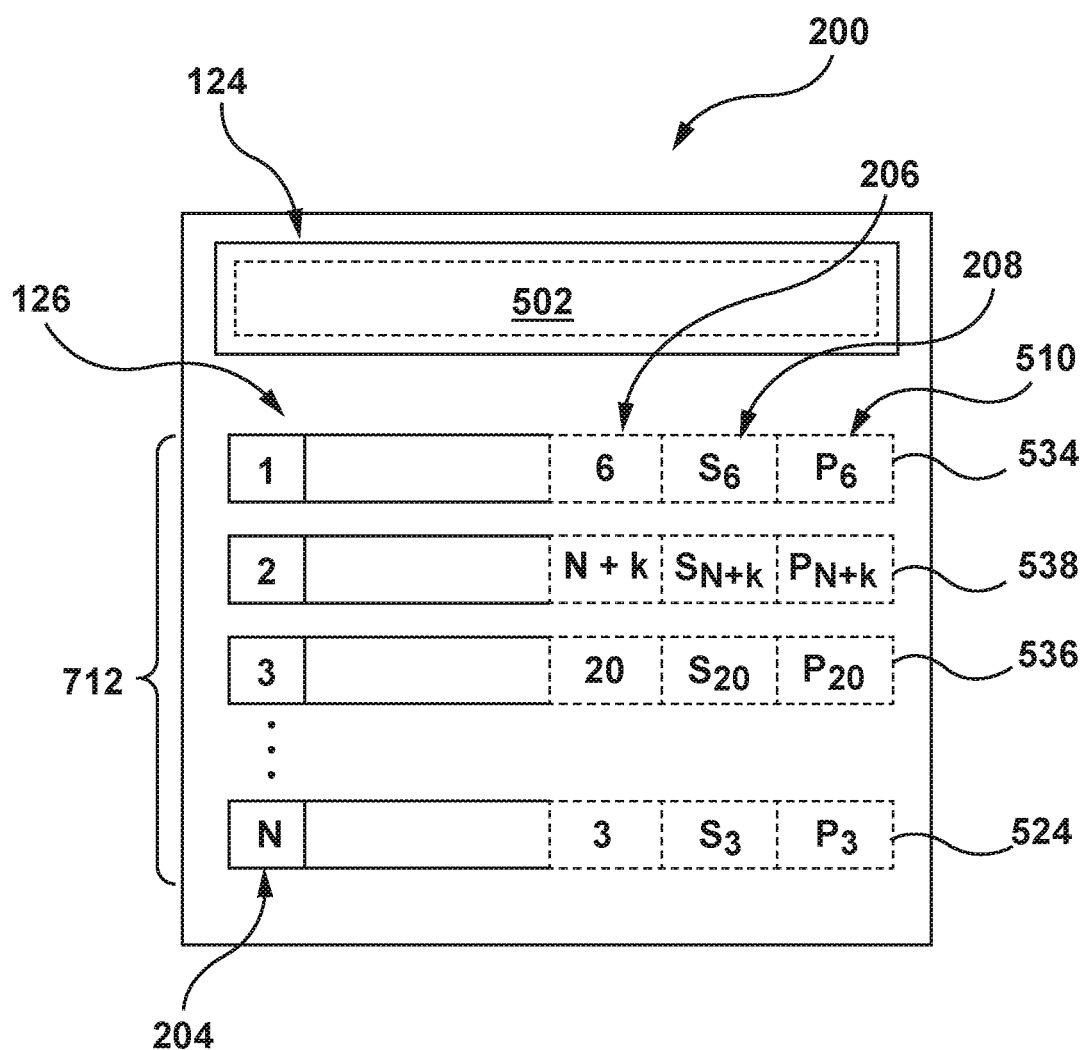

Once the server 106 has received the indication of the filter request 118, the server 106 selects a subset of digital objects, from the set of digital objects, to be included in a re-ranked set of digital objects as it is depicted in FIGS. 5 to 7. Referring to FIG. 7, responsive to the indication of the filter request 118, the server 106 selects digital objects for including in a re-ranked set of digital objects 712 from the set of digital objects 512 (depicted in FIG. 5) that has been ranked based on objective characteristics of the digital objects contained therein.

To that end, the server 106 may further be configured to determine, for a given digital object in the set of digital objects, an object parameter whose value is indicative of a likelihood that an inclusion of the given digital object into the re-ranked set of digital objects would increase a given ranking quality metric of the re-ranked set of digital objects considering the objective characteristic of the digital objects.

The quality metric may include any suitable quality metric, such as but not limited to:
  Discounted Cumulative Gain (DCG) quality metric function;
  Normalized Discounted Cumulative Gain (NDCG) quality metric function;
  Expected Reciprocal Rank (EPR) quality metric function;
  Mean Average Precision (MAP) quality metric function; and
  Mean Reciprocal Rank (MRR) quality metric function.

Having determined the object parameters for each of the digital objects in the set of digital object, the server 106 then may proceed to select, based thereon, the digital objects for inclusion in the re-ranked set of digital objects. How the server 106 selects the digital objects based on their object parameters is not limited and may include, for example, selecting based on a pre-determined threshold.

Once the server 106 has selected the digital objects for inclusion in the re-ranked set of digital objects, it may then rank them according to the secondary characteristic thereof, such that digital objects having smaller values the chosen, by the user 112, secondary characteristic of the set of digital objects will be placed first in the re-ranked set of digital objects. By so doing, the server 106 then may generate a data-packet 120 indicative of the re-ranked set of digital objects, wherein the digital objects are ranked according to the secondary characteristic thereof. Finally, the server 106 may transmit, via the communication network 104, the data-packet 120 to the electronic device 108 to present at least part of the re-ranked set of digital objects to the user 112 in the results display portion 126 of the given digital object service 110.

In the non-limiting embodiments of the present technology, once the server 106 has selected the digital objects for inclusion in the re-ranked set of digital objects, it may then be configured to select a subset of thereof for ranking according to the secondary characteristic selected by the user 112. In these embodiments, a number of digital objects in the subset of digital objects may be determined based on a number of digital objects presentable in the results display portion 126 of the giving digital object service 110

In the non-limiting embodiments of the present technology, the object parameters are determined by an MLA. In the non-limiting embodiments of the present technology, the server 106 may execute the MLA that is based on neural networks, decision tree models, gradient boosted decision tree based MLA, association rule learning based MLA, Deep Learning based MLA, inductive logic programming based MLA, support vector machines based MLA, clustering based MLA, Bayesian networks, reinforcement learning based MLA, representation learning based MLA, similarity and metric learning based MLA, sparse dictionary learning based MLA, genetic algorithms based MLA, and the like. The server 106 may employ a supervised-learning based MLA without departing from the scope of the present technology.

Generally speaking, the server 106 can be said to be used in two phases. A first phase of the two phases is a training phase where the server 106 is "trained", on a training set of data, to derive an MLA formula.

A second phase of the two phases is an in-use phase where the server 106 is used to determine object parameters for digital objects in the set of digital objects.

In additional embodiments of the present technology, the server 106 may be "retrained", following the in-use phase, to derive a new MLA formula or to calibrate the MLA formula for the MLA. Indeed, as it will be described further below, the MLA "retrained" based on enhanced training data resulting from the implementation of some embodiments of the present technology.

The training and the in-use phases of the MLA will now be discussed with reference to FIGS. 2 and 7.

Training Phase

Figure 2:
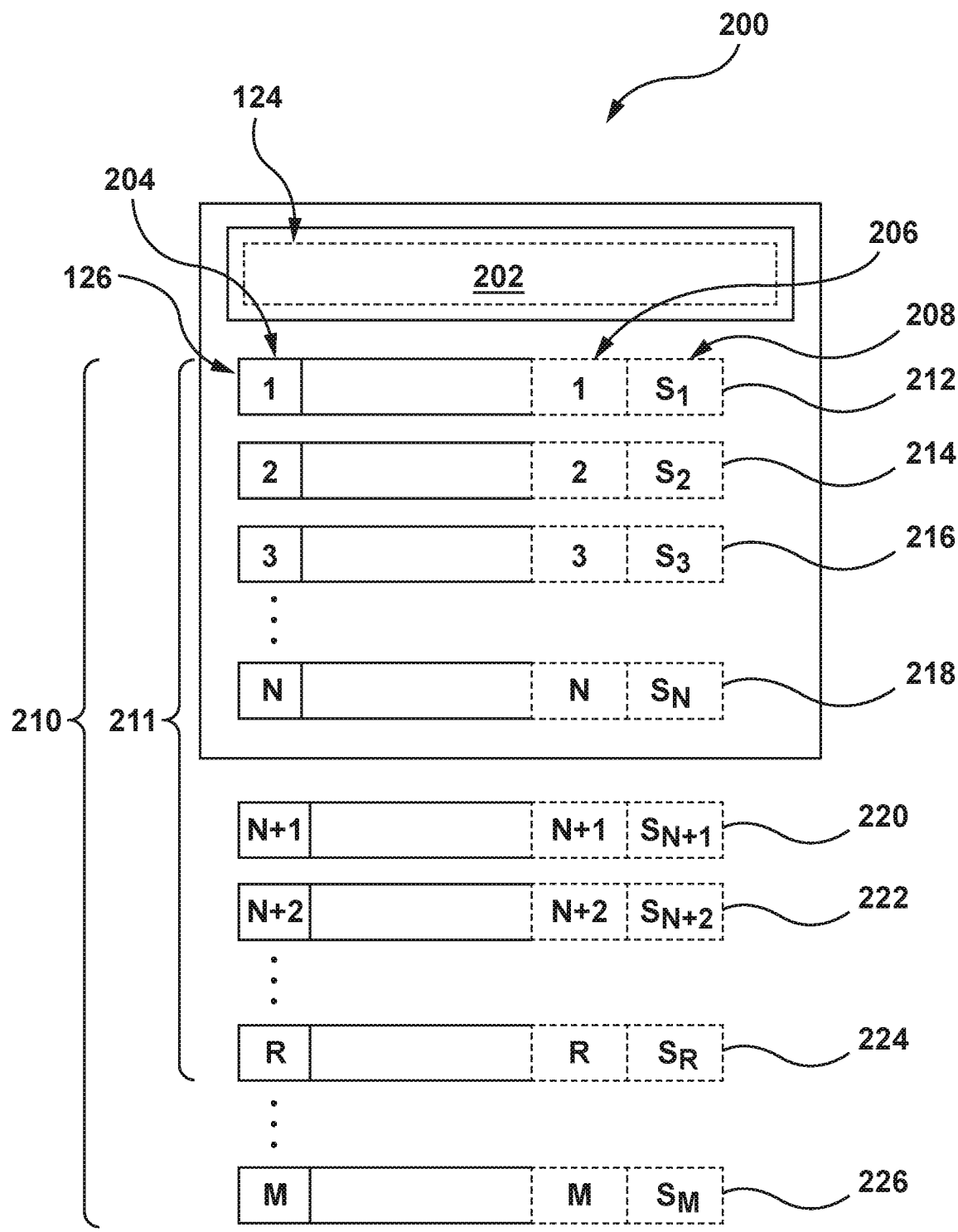
FIGS. 2 to 4 depict an example of a training phase for an MLA used in the system of FIG. 1, according to the non-limiting embodiments of the present technology.
Figure 3:
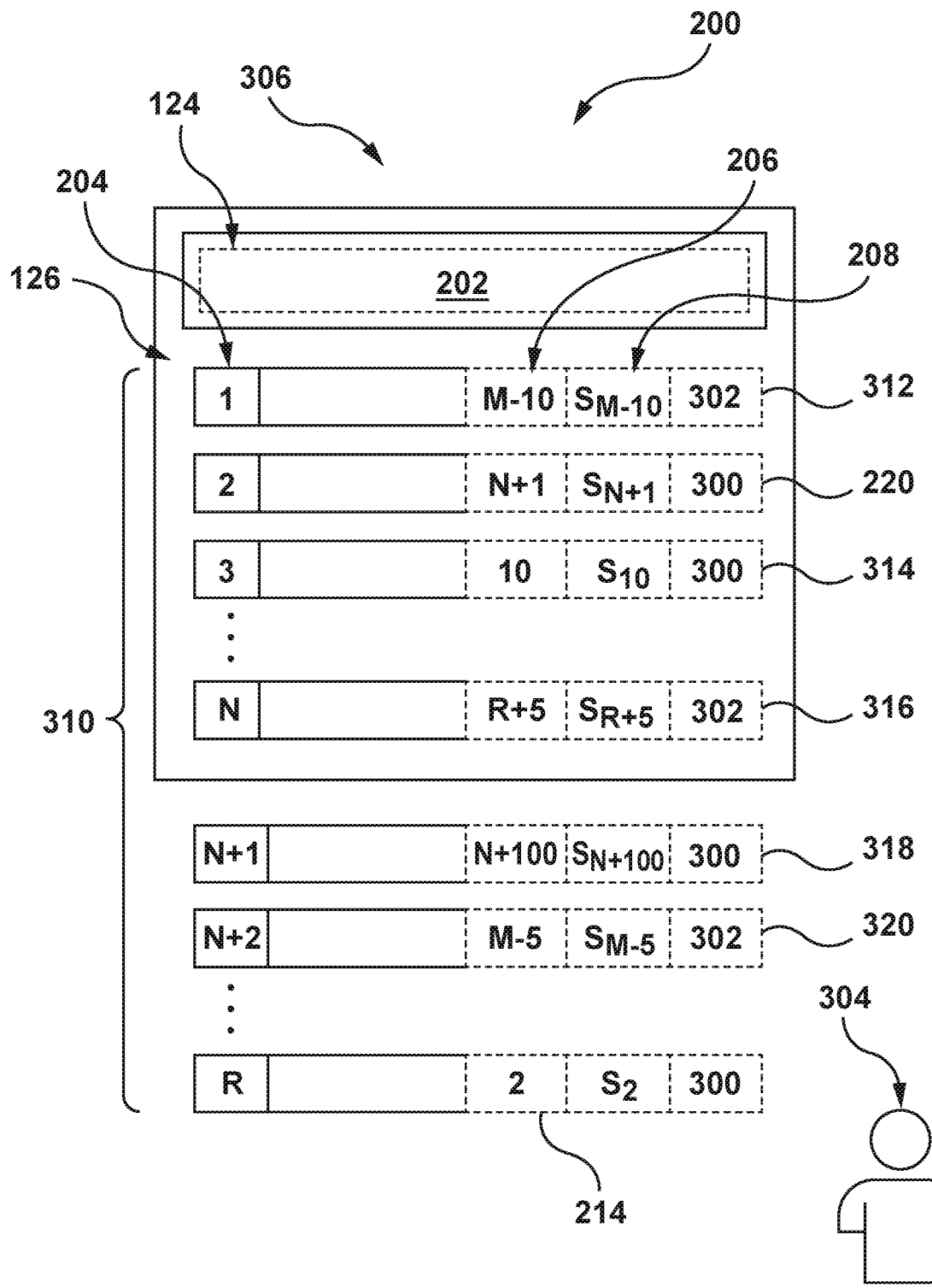
Figure 4:
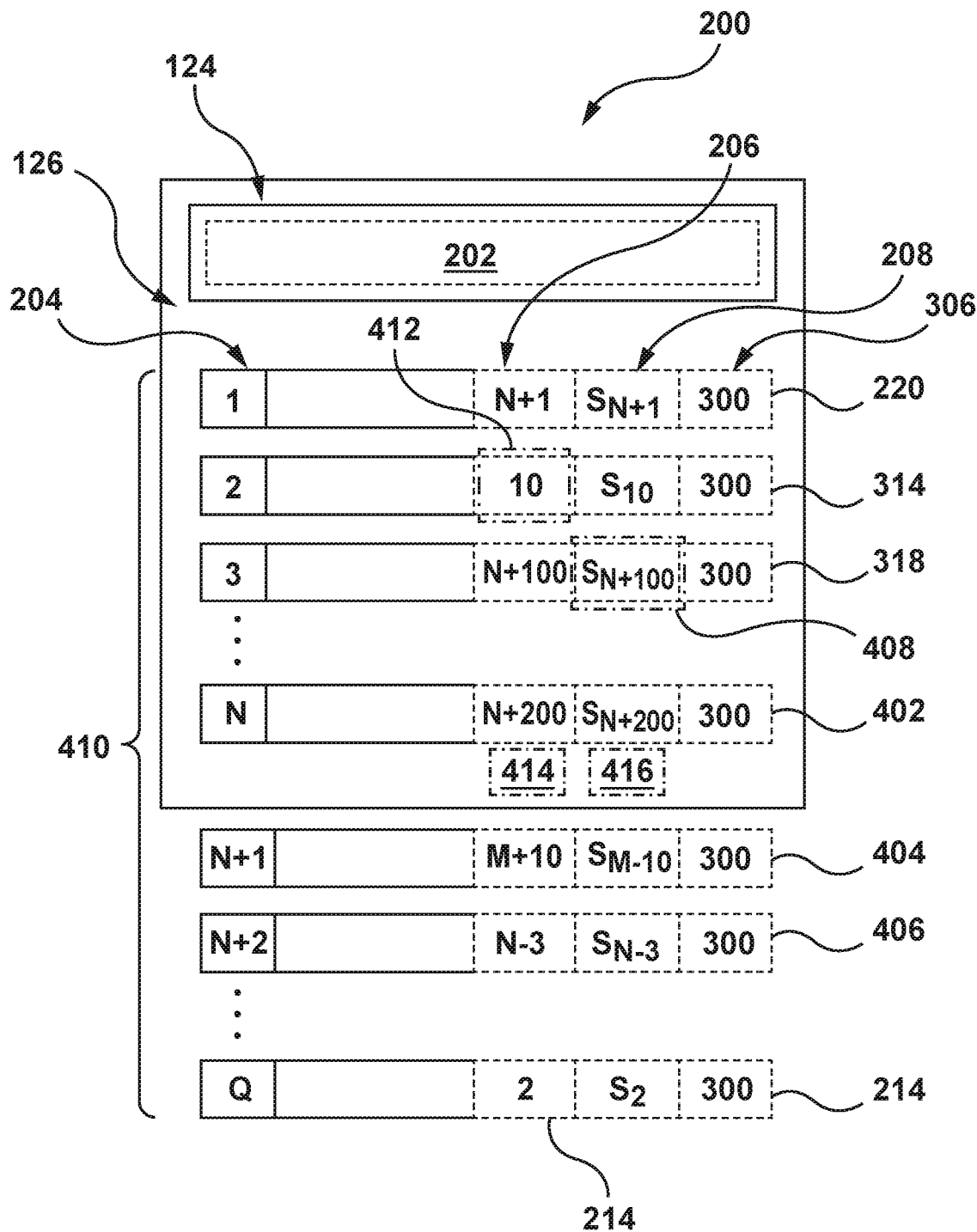

With reference now to FIGS. 2 to 4, which schematically depict a process for generating a training set of data for training the MLA used in the system 100 for ranking digital objects based on objective characteristics associated therewith, according to the non-limiting embodiments of the present technology.

As mentioned before, the process for generating the training set of data may be performed, for example, by the server 106.

First, with specific reference to FIG. 2, which schematically depicts a graphical interface (GI) 200 of the digital object service 110 used in the training phase. As mentioned above, a user (for example, the user 112) provides a training user request 202 to the search interface 124. The server 106, in response to the training user request 202, is configured to output a set of training digital objects 210 (for example, at least part of digital objects of the pool of digital objects 122), wherein each of the set of training digital objects 210 is relevant to the training user request 202 based on respective values of a ranking parameter 206 associated therewith. The respective values of the ranking parameter 206 have been generated by the server 106 based on respective values of an objective characteristic that are indicative of relevance of the training digital objects in the set of training digital objects 210 to the training user request 202.

According to the non-limiting embodiments of the present technology, the training digital objects in the set of training digital objects 210 may have index numbers 204. In the embodiments of FIG. 2, the set of training digital objects 210 includes M training digital objects, wherein an index number of a training digital object 212 that is presented first is '1', and an index number of a training digital object 226 that is presented last in the set of training digital objects 210 is M'. First N digital objects of the set of digital objects 210 are presented to the user 112 in the results display portion 126 of the digital object service 110. As such, an index number of a training digital object 216 that is presented last in the results display portion 126 is 'N'. In the non-limiting embodiments of the present technology, the number 'N' can be determined inter alia based on a size of the results display portion 126, wherein the size of the results display portion 126 may depend on the electronic device 108. The numbers 'M' and 'N', as well as the intermediate numbers, belong to the set of all integer positive numbers, wherein 'M' is greater than 'R', and 'R' is greater than 'N'.

In the embodiments of FIG. 2, the server 106, before presenting the training digital objects to the user 112, is configured to rank the training digital objects within the set of training digital objects 210 according to the respective values of the ranking parameter 206 associated therewith, as such, training digital objects that are likely to be more relevant to the training user request 202 are placed first in the set of training digital objects 210. Thus, the training digital object 212 is likely to be the most relevant to the training user request 202 in the set of training digital objects 210 as its value of the ranking parameter 206 is '1'. The training digital object 226 is likely to be the least relevant to the training user request 202 in the set of training digital objects 210 as its value of the ranking parameter 206 is M'. Digital objects 214 to 224 have intermediate values of the ranking parameter 206 from '2' to 'R', respectively.

Each one of the set of training digital objects 210 has at least one training secondary characteristic associated therewith, for example, a secondary characteristic 208. The secondary characteristic 208 is indicative of a relation of one training digital object to another training digital object. Accordingly, the training digital object 212 has a value of the secondary characteristic 208 '$S_1$'. The other training digital objects 214 to 226 have values of the secondary characteristic 208 from '$S_2$' to '$S_M$', respectively.

Also, before presenting to the user 112, the server 106 may be configured to discard certain training digital objects from the set of training digital objects 210, whose rank values of the ranking parameter 206 are greater than a predetermined threshold value. By so doing, the server 106 is configured to filter out less relevant training digital objects. In the embodiments of FIG. 2, the predetermined threshold value is set at 'R'. Thus, training digital objects, whose values of the ranking parameter 206 are 'R+1' and greater, are discarded from the set of training digital objects 210, and a subset of training digital objects 211 including first R training digital objects, is presented to the user 112. The subset of training digital objects 211 is ranked according to the objective characteristic thereof.

Referring now to FIG. 3, the user 112 may further generate and transmit to the server 106 a training filter request 306. The training filter request 306 is used to order the subset of training digital objects 211 according to respective values from '$S_1$' to '$S_R$' of the secondary characteristic 208 associated therewith in an ascending order (a training digital object having the smallest value of the secondary characteristic being on top). In response to receiving the training filter request 306, the server 106 is configured to order the training digital objects within the subset of training digital objects 211 by the secondary characteristic 208. As such, the server 106 is configured to generate a re-ranked subset of training digital objects 310.

In the re-ranked subset of training digital objects 310, the training digital objects are no longer ranked according to the values of the ranking parameter 206 associated therewith. For example, a training digital object 312 having a value of 'M-10' of the ranking parameter 206 is now ranked first as having the smallest value of the secondary characteristic 208 within the re-ranked subset of digital objects 310. Also, the training digital object 214 having the value of '2' of the ranking parameter 206 is now ranked last as having the greatest value of the secondary characteristic 208.

In the non-limiting embodiments of the present technology, the server 106 may then be configured to store (for example, in the database 102) the re-ranked subset of training digital objects 310 in association with the training user request 202.

Continuing with reference to FIG. 3, the server 106 may be configured to retrieve, from the database 102, the re-ranked subset of training digital objects 310 to provide the re-ranked subset of training digital objects 310 to a human assessor 304. The human assessor 304 then assigns assessor-generated labels to each of the re-ranked subset of training digital objects 310.

Generally speaking, the assessor-generated labels 300 and 302 are indicative of whether a given one in the re-ranked subset of training digital objects 310 is relevant to a search intent of the training user request 202 (a label depicted at 300), or is not relevant and (a label depicted at 302). Depending on specific implementations, the human assessor 304 is provided with one of various labelling instructions (i.e., one of various pluralities of assessor-generated labels), such as, but not limited to:
  a binary choice of either YES or NO
  a scale of "1" to "5",
  a scale of "1" to "10",
  a scale of "good" and "bad",
  a scale of "low relevance", "medium relevance" and "high relevance",
  a scale of "Perfect-Excellent-Good-Fair-Bad",
  etc.

For example, in the embodiments of FIG. 3, training digital objects 220, 314, 318, and 214 are determined to be relevant to the training user request 202 as having been labelled, by the human assessor 304, with the assessor-generated label 300. Training digital objects 312, 316, and 320 are determined as irrelevant to the training user request 202 as having been labelled, by the human assessor 304, with the assessor-generated label 302. The server 106 can also save the re-ranked subset of training digital objects 310 including the labelled, by the human assessor 304, training digital objects in the database 102.

In the non-limiting embodiments of the present technology, instead of assigning labels by the human assessor 304, an MLA may be trained by the server 106 to predict one of the assessor-generated labels 300 or 302 to the training digital objects in the re-ranked set of training digital objects 310.

With reference now to FIG. 4, the server 106 is further configured to discard the training digital objects labelled irrelevant from the re-ranked subset of training digital objects 310. To that end, the server 106 is configured to generate a revised subset of training digital objects 410. The revised subset of training digital objects 410 now includes only training digital objects that have been labelled with label 300 by the human assessor 304. As such, the revised subset of digital objects 410 includes training digital objects that are (1) ranked according to the corresponding values of the secondary characteristic 208, and (2) determined to be relevant to the training user request 202.

As training digital objects having been labelled with label 302 were discarded by the server 106, the revised subset of training digital objects 410 includes Q training digital objects, wherein 'Q' is less than 'R'.

In the non-limiting embodiments of the present technology, based on the revised subset of training digital objects 410, the server 106 is further configured to generate and store additional features. The additional features include: (1) a highest value of the secondary characteristic 208 amongst top N training digital objects; (2) a highest value of the ranking parameter 206 amongst the top N training digital objects; (3) an average value of the secondary characteristic 208 over the top N training digital objects; and (4) an average value of the ranking parameter 206 over the top N training digital objects.

For example, the server 106 is configured to determine that a value 408 of the secondary characteristic 208 of the training digital object 318 is the highest amongst the top N training digital objects 220, 314, 318 . . . 402. Similarly, the server 106 is configured to determine that a value 412 of the ranking parameter 206 is the greatest amongst the top N training digital objects 220, 314, 318 . . . 402. Finally, the server 106 is configured to determine, over the top N training digital objects in the revised set of training digital objects 410, an average value 414 of the ranking parameter 206 and, an average value 416 of the secondary characteristic 208.

In the non-limiting embodiments of the present technology, the server 106 may predict the additional features 408, 412, 414, and 416 by another MLA. To that end, the server 106 may be configured to use at least part of the data described hereinabove with reference to FIGS. 1 to 4 to train that MLA to predict the additional features.

The server 106 may then be configured to store the additional features 408, 412, 414, and 416 in association with the revised subset of training digital objects 410 in the database 102.

Thus, during the training phase of the MLA, the server 106 is configured to provide the MLA with a training set of data having a plurality of training objects, such that each training digital object that is associated with a given one of the re-ranked subset of training digital objects 310, there is provided: (1) the training user request 202; (2) a respective value of the ranking parameter 206; (3) a respective value of the secondary characteristic 208; (4) and a corresponding "label". Within the embodiments of the present technology, the label can be the assessor-generated labels 300 and 302 discussed hereinabove.

In the non-limiting embodiments of the present technology, the training set of data may also comprise (5) the additional features 408, 412, 414, and 416 associated with the top N training digital objects in the revised subset of training digital objects 410.

It is to be expressly understood that, according to the non-limiting embodiments of the present technology, the training set of data may not be limited by data generated by the server 106 in response to only training user request 202. Following examples provided in respect of FIGS. 2 to 4, the server 106 may be configured to generate the training set of data in response to hundreds, thousands, or even hundreds of thousands training user requests similar to the training user request 202.

Thus, having now generated the training set of data, the server 106 may be further configured to train the MLA in order to derive the MLA formula. The MLA formula is thus used in the in-use phase for generating values of the object parameter for the digital objects.

Accordingly, a given value of the object parameter that the MLA is trained, based on the training set of data, to generate for a given digital object in the set of digital objects 512, is indicative of a likelihood that an inclusion of the given digital object in the re-ranked set of digital objects 712 will result in an increased usefulness of the re-ranked set of digital objects 712 to the user 112. According to the non-limiting embodiments of the present technology, the usefulness of the re-ranked set of digital objects 712 to the user 112 may be determined based on one of quality metrics discussed hereinabove.

How the selection of digital objects for inclusion in the re-ranked set of digital objects 712 is implemented will be now described with reference to FIGS. 5 to 7.

In-Use Phase

First, referring to FIG. 5 schematically depicting the GI 200 of the digital object service 110 used in the in-use phase, according to the non-limiting embodiments of the present technology. Responsive to the user 112 having submitted a user request 502, the server 106 is configured to provide a set of digital objects 512, where the digital objects may have been ranked according to respective values of the ranking parameter 206. The values 1 to M of the ranking parameter 206 have been generated by the server 106 based on corresponding values of an objective characteristic that are indicative of relevance of the digital objects to the user request 502.

Similarly to the examples presented above in respect of the training phase, each digital object having respective index numbers 204 1 to M in the set of digital objects 512 has a corresponding value $S_1$ to $S_M$ of the secondary characteristic 208.

According to the non-limiting embodiments of the present technology, each digital object in the set of digital objects 512 has a corresponding value of an object parameter $p_1$ to $p_M$ 510 generated by the server 106. The server 106 is configured to have generated the values of the object parameter 510 by the MLA trained in accordance with a method presented herein with reference to FIGS. 2 to 4. A given value of the object parameter 510, associated with a given digital object, is indicative of a likelihood that inclusion of the given digital object in the re-ranked set of digital objects 712 (depicted in FIG. 7) would increase a given quality metric of the re-ranked set of digital objects 712.

According to some non-limiting embodiments of the present technology, the given quality metric may be based on a relevancy of the re-ranked set of digital objects 712 to the user request 502. In this regard, the relevancy is based on respective values of the ranking parameter 206 associated with the digital objects in the re-ranked set of digital objects 712.

According to the other non-limiting embodiments of the present technology, the given quality metric may be based on respective predicted values of the secondary characteristic 208 associated with top-N digital objects in the re-ranked set of digital objects 712.

Responsive to receiving the indication of the filter request 118 from the electronic device 108, the server 106 is configured to generate the re-ranked set of digital objects 712. To that end, the server may be configured to select digital objects from the set of digital objects 512 based on the values of the object parameter 510 associated therewith.

The non-limiting embodiments of the present technology are based on a premise of a trade-off between a number of digital objects to be included in the re-ranked subset of digital objects and respective values of the ranking parameter 206 associated therewith. In other words, the trade-off is between the relevancy of the digital objects placed on higher positions in the re-ranked list of digital objects and the digital objects displaced from the higher positions. In case the objective relevancy of the displaced objects is comparatively higher, the user would be dissatisfied. Thus, the trained MLA, in a sense, balances the relevancy of the digital objects ranked on the higher positions of the ranked list and the displaced digital objects.

In the non-limiting embodiments of the present technology, the number of digital objects to be included in the re-ranked set of digital objects 712 may be indicative of a predetermined number of higher ranked positions of digital objects in the re-ranked set of digital objects 712. For example, the pre-determined number of higher ranked positions may be determined as top-N ranked positions in the results display portion 126.

For example, the server 106 may be configured to generate the values of the object parameter 510 in such a way that the greater the number of digital objects to be included in the re-ranked set of digital objects 712 is, the lesser number of less relevant, to the user request 502, digital objects will be included, and vice versa. By so doing, the server 106 is configured to diversify, based on respective values of the objective characteristic, digital objects in the re-ranked set of digital objects 712 within a predefined number of positions thereof.

In the non-limiting embodiments of the present technology, the selection of digital objects for the re-ranked set of digital objects 712 can be performed by the server 106 based on a predetermined threshold value of the object parameter 510. By so doing, the server 106 is configured, first, to generate a subset of digital objects 612 depicted in FIG. 6. In this regard, the server 106 may receive, or otherwise, determine or generate the predetermined the predetermined threshold value of the object parameter 510 before generating the subset of digital objects 612.

Referring to FIGS. 5 and 6, the server 106 may determine that respective values of the object parameter 510 associated with digital objects 520, 522, and 532 are less than the predetermined threshold value of the object parameter 510.

Accordingly, the server 106 may be further configured to discard the digital objects 520, 522, and 532 from the set of digital objects 512.

Thus, the server 106 is configured to generate the subset of digital objects 612. The subset of digital objects 612 includes L digital objects, wherein 'L' is less than M', that were selected by the server 106 based on their respective values of the object parameter 510.

The server 106 may further be configured, based on the number of digital objects to be included in the re-ranked set of digital objects 712, to select digital objects from the subset of digital objects 612. In the embodiments of FIG. 7, the number of digital objects to be included in the re-ranked set of digital objects 712 has been determined to be 'N'. Thus, the server 106 selects N top ranked digital objects from the subset of digital objects 612 and ranks these digital objects according to respective values of the secondary characteristic 208 associated therewith, thereby generating the re-ranked set of digital objects 712.

Thus, the re-ranked set of digital objects 712 is then presented to the user 112 in response to the filter request 118 in the results display portion 126 of the digital object service 110 run by the electronic device 108.

Figure 8:
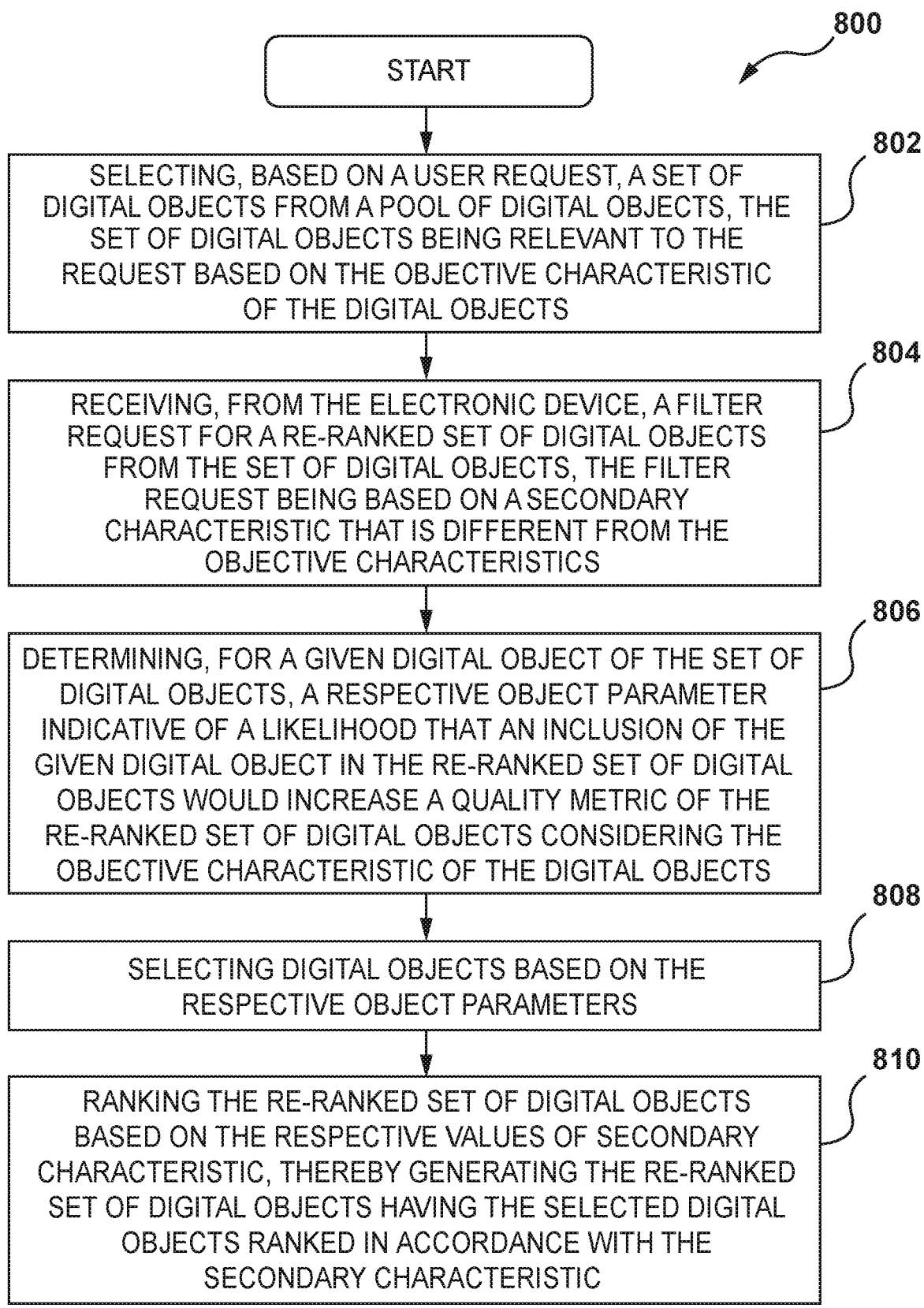
FIG. 8 depicts a flowchart of a method for ranking digital objects based on objective characteristics associated therewith, according to the non-limiting embodiments of the present technology.

Given the architecture and the examples provided hereinabove, it is possible to execute a method for ranking digital object based on an objective characteristic associated therewith With reference now to FIG. 8, there is depicted a flowchart of a method 800, according to the non-limiting embodiments of the present technology. The method 800 is executable by the server 106.

Step 802—Selecting, Based on a User Request, a Set of Digital Objects from a Pool of Digital Objects, the Set of Digital Objects being Relevant to the Request Based on the Objective Characteristic of the Digital Objects.

The method 800 commences at step 802 with the server 106 selecting (for example, from the pool of digital objects 122) a set of digital objects in response to a user request. For example, the server 106 may select the set of digital objects 512 in response to the user request 502 submitted to a digital object service (for example, the digital object service 110) via the electronic device 108 by the user 112.

In the non-limiting embodiments of the present technology, the digital objects of the set of digital objects 512 have been selected to be relevant to the user request 502 based on values of an objective characteristic associated therewith. To that end, the server 106 may have been configured, based on the objective characteristic, to generate, for each object of the set of digital objects 512, a respective value of the ranking parameter 206. The so-generated values of the ranking parameter 206 are suitable for ranking the digital objects associated therewith. As such, the set of digital objects 512 may be a ranked, according to respective values of the ranking parameter 206, set of digital objects.

Step 804—Receiving, from the Electronic Device, a Filter Request for a Re-Ranked Set of Digital Objects from the Set of Digital Objects, the Filter Request being Based on a Secondary Characteristic that is Different from the Objective Characteristic.

In step 804, the server 106 is configured to receive an indication of a filter request (for example, the indication of the filter request 118) for a re-ranked set of digital objects (the re-ranked set of digital objects 712, for example).

In this regard, in the non-limiting embodiments of the present technology, each of the set of digital objects 512 has also a respective value of at least one secondary characteristic (the secondary characteristic 208, for example).

In the non-limiting embodiments of the present technology, the secondary characteristic 208 is different from the objective characteristic of the digital objects in the set of digital objects 512. Further, the values of the secondary characteristic 208 are not indicative of relevance of digital objects in the set of digital objects 512 to the user request 502. Accordingly, ranking the set of digital objects 512 according to the respective values of the secondary characteristic 208 is different from ranking according to the values of the ranking parameter 206 based on the objective characteristic.

In some non-limiting embodiments of the present technology, the secondary characteristic 208 is indicative of an inherent parameter of a given digital object and another digital object in the set of digital objects 512.

In the other non-limiting embodiments of the present technology, the secondary characteristic 208 is indicative of a relative value parameter of the given digital object to the other digital object in the set of digital objects 512.

Accordingly, if the digital object service 110 is an e-commerce platform, the digital objects may be offers of a particular product, and the secondary characteristic 208 thereof may be one of a price, a shipment date, user popularity, and the like, or a relative value thereof.

Thus, the indication of the filter request 118 is based on the secondary characteristic 208, whereby the user 112 may re-rank the set of digital objects 512 according to respective values of the secondary characteristic 208 associated therewith, for example, in an ascending order.

Step 806—Determining, for a Given Digital Object of the Set of Digital Objects, a Respective Object Parameter Indicative of a Likelihood that an Inclusion of the Given Digital Object in the Re-Ranked Set of Digital Objects would Increase a Quality Metric of the Re-Ranked Set of Digital Objects Considering the Objective Characteristic of the Digital Objects.

In step 806, the server 106 is configured to determine, for each digital object in the set of digital objects 512, a respective value of the object parameter 510. A given value of the object parameter 510 associated with a given digital object in the set of digital objects 512 is indicative of a likelihood that an inclusion of the given digital object in the re-ranked set of digital objects 712 would increase a given quality metric of the re-ranked set of digital objects 712.

The given quality metric is indicative of "usefulness" of the re-ranked set of digital objects 712 and, according to the non-limiting embodiments of the present technology, may comprise one of:

Discounted Cumulative Gain (DCG) quality metric function;
Normalized Discounted Cumulative Gain (NDCG) quality metric function;
Expected Reciprocal Rank (EPR) quality metric function;
Mean Average Precision (MAP) quality metric function; and
Mean Reciprocal Rank (MRR) quality metric function.

In some non-limiting embodiments of the present technology, the given quality metric may be based on a relevancy of the re-ranked set of digital objects 712 to the user request 502. In this regard, the relevancy is based on respective values of the ranking parameter 206 associated with the digital objects in the re-ranked set of digital objects 712.

In the other non-limiting embodiments of the present technology, the given quality metric may be based on respective predicted values of the secondary characteristic 208 associated with top-N digital objects in the re-ranked set of digital objects 712.

In the non-limiting embodiments of the present technology, the values of the object parameter 510 are generated, by the server 106, using an MLA trained to predict the likelihood that the inclusion of the given digital object in the re-ranked set of digital objects 712 would result in an increased given quality metric. In this regard, the server 106 may be configured to generate the training set of data for training the MLA as set forth hereinabove with reference to FIGS. 2 to 4.

Thus, in the non-limiting embodiments of the present technology, the training set of data used for training the MLA comprises a set of training digital objects, wherein each training digital object is associated with (i) a training request that was used to generate the set of training digital objects, (ii) an indication of a secondary characteristic of the training digital object; and (iii) an assessor-generated label indicative of whether the training digital object should be included in a subset of training digital objects considering the secondary characteristic and relevance of the training digital object to the training request.

In the non-limiting embodiments of the present technology, the server 106 may be configured to generate and use, as part of the training set of data for training the MLA, the following additional features: (1) a highest value of the secondary characteristic amongst top N training digital objects in the subset of training digital objects; (2) a highest value of the ranking parameter amongst the top N training digital objects in the subset of training digital objects; (3) an average value of the secondary characteristic 208 over the top N training digital objects in the subset of training digital objects; and (4) an average value of the ranking parameter 206 over the top N training digital objects in the subset of training digital objects.

In the non-limiting embodiments of the present technology, the MLA is a gradient boosted decision tree based MLA.

In the non-limiting embodiments of the present technology, the values of the object parameter 510 are based on a trade-off between a number of digital objects to be included in the re-ranked set of digital object 712 and relevance thereof that is represented by respective values of the ranking parameter 206. In other words, the trained MLA, in a sense, balances the relevancy of the digital objects ranked on the higher positions of the ranked list and the displaced digital objects.

In the non-limiting embodiments of the present technology, the number of digital objects in the re-ranked set of digital objects 712 may be selected as a number of higher ranked positions in the re-ranked set of digital objects 712. According to these embodiments, the number of higher ranked positions of the re-ranked set of digital objects 712 depends on the results display portion 126 associated with the electronic device 108.

Step 808—Selecting Digital Objects Based on the Respective Object Parameters.

Having generated, for each of the digital objects in the set of digital objects 512, a respective value of the object parameter 510, the server 106 is then configured, based thereon and the number of digital objects to be included, to select digital object for inclusion in the re-ranked set of digital objects 712.

In the non-limiting embodiments of the present technology, the selecting may include selecting based on a predetermined threshold value of the object parameter 510.

Step 810—Ranking the Re-Ranked Set of Digital Objects Based on the Respective Values of Secondary Characteristic, Thereby Generating the Re-Ranked Set of Digital Objects Having the Selected Digital Objects Ranked in Accordance with the Secondary Characteristic.

In step 810, the server 106 is configured to rank the selected, at step 808, digital objects for the re-ranked set of digital objects 712 according to respective values of the secondary characteristic 208 associated therewith, thereby generating the re-ranked set of digital objects 712.

The ranking the digital objects according to their respective values of the secondary characteristic 208 corresponds to the indication of the filter request 118.

In the non-limiting embodiments of the present technology, the server 106 is then may be configured to generate the data-packet 120 indicative of the re-ranked set of digital objects 712 and transmit it to the electronic device 108 for presentation of the re-ranked set of digital objects 712, in the results display portion 126 of the digital object service 110, to the user 112.

In some non-limiting embodiments of the present technology, the method 800 can be implemented in a single phase, whereby the list of digital objects is ranked and filtered in a single step (i.e. the list presented is a ranked and filtered list). In other embodiments of the present technology, the method 800 can be implemented in two phases—first a ranked list of digital objects is generated (based on the objective characteristic) and, then, in response to a filter request, a re-ranked and filtered list is generated.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for ranking digital objects based on an objective characteristic associated therewith, the ranking being executed in response to a request received from an electronic device associated with a user, the method executable by a server communicatively accessible by the electronic device via a communication network, the method comprising:
   based on the request, selecting a set of digital objects from a pool of digital objects, the set of digital objects being relevant to the request based on the objective characteristic of the digital objects, the set of digital objects being rankable in accordance with the objective characteristic thereof;
   receiving, from the electronic device, a filter request for a re-ranked set of digital objects from the set of digital objects, the filter request being based on a secondary characteristic that is different from the objective characteristic;
   selecting digital objects to be included in the re-ranked set of digital objects by:
      determining, for a given digital object of the set of digital objects, a respective object parameter indicative of a likelihood that an inclusion of the given digital object in the re-ranked set of digital objects would increase a quality metric of the re-ranked set of digital objects considering the objective characteristic of the digital objects, the quality metric being indicative of how relevant the re-ranked set of digital objects is to a search intent of the request;

selecting digital objects based on the respective object parameters; and ranking the re-ranked set of digital objects based on the respective values of secondary characteristic, thereby generating the re-ranked set of digital objects having the selected digital objects ranked in accordance with the secondary characteristic.

2. The method of claim 1, wherein the objective characteristic is indicative of relevance of the given digital object to the request.

3. The method of claim 2, wherein the secondary characteristic is not indicative of relevance of the given digital object to the request.

4. The method of claim 3, wherein the secondary characteristic is indicative of a relative value parameter of the given digital object relative to an other one of the set of digital objects.

5. The method of claim 4, wherein the secondary characteristic enables ranking digital objects in accordance with the secondary characteristic, which ranking is different from a ranking based on the objective characteristic.

6. The method of claim 4, wherein the secondary characteristic is indicative of an inherent parameter of the given digital object and the other one of the set of digital objects.

7. The method of claim 6, wherein the inherent parameter is not directly indicative of the relevance of the given digital object to the request.

8. The method of claim 1, wherein the object parameter is determined by a Machine Learning Algorithm (MLA).

9. The method of claim 8, wherein the method further comprises training the MLA.

10. The method of claim 9, wherein the training the MLA comprises feeding the MLA a set of training digital objects, each of the set of training digital objects including: (i) a training digital object that is part of a training set of digital objects; (ii) a training request that was used to generate the training set of digital objects, (iii) an indication of a secondary characteristic of the training digital object; and (iv) an assessor-generated label indicative of whether the training digital object should be included in a sub-set of training digital objects considering the secondary characteristic and relevance of the training digital object to the training request.

11. The method of claim 8, wherein the MLA is a gradient boosted decision tree based MLA.

12. The method of claim 1, wherein the re-ranked set of digital objects has fewer digital objects than the set of digital objects.

13. The method of claim 1, wherein the object parameter is based on a trade-off between a number of digital objects to be included in the re-ranked set of digital objects and relevance of included digital objects of the re-ranked set of digital objects.

14. The method of claim 13, wherein the trade-off is for a sub-set of higher ranked positions of the re-ranked set of digital objects.

15. The method of claim 14, wherein the sub-set of higher ranked positions is a top-N number of positions of the re-ranked set of digital objects.

16. The method of claim 1, wherein the quality metric is based on a relevancy of the re-ranked set of digital objects to the request based on the objective characteristic.

17. The method of claim 1, wherein the quality metric is based on a predicted value of the secondary characteristic of top N-digital objects of the re-ranked set of digital objects.

18. A system for ranking digital objects based on an objective characteristic associated therewith, the system comprising a hardware server coupled, via a communication network, to an electronic device associated with a user, the hardware server being configured to:

receive, from the electronic device, a request for ranking digital objects;

select, based on the request, a set of digital objects from a pool of digital objects, the set of digital objects being relevant to the request based on the objective characteristic of the digital objects, the set of digital objects being rankable in accordance with the objective characteristic thereof;

receive, from the electronic device, a filter request for a re-ranked set of digital objects from the set of digital objects, the filter request being based on a secondary characteristic that is different from the objective characteristic;

select digital objects to be included in the re-ranked set of digital objects by:

determine, for a given digital object of the set of digital objects, a respective object parameter indicative of a likelihood that an inclusion of the given digital object in the re-ranked set of digital objects would increase a quality metric of the re-ranked set of digital objects considering the objective characteristic of the digital objects, the quality metric being indicative of how relevant the re-ranked set of digital objects is to a search intent of the request;

select digital objects based on the respective object parameters; and rank the re-ranked set of digital objects based on the respective values of secondary characteristic, thereby generating the re-ranked set of digital objects having the selected digital objects ranked in accordance with the secondary characteristic.

19. The system of claim 18, wherein the hardware server is further configured to determine the object parameter using an MLA.

20. The system of claim 18, wherein the hardware server is further configured to train the MLA by feeding the MLA a set of training digital objects, each of the set of training digital objects including: (i) a training digital object that is part of a training set of digital objects; (ii) a training request that was used to generate the training set of digital objects, (iii) an indication of a secondary characteristic of the training digital object; and (iv) an assessor-generated label indicative of whether the training digital object should be included in a sub-set of training digital objects considering the secondary characteristic and relevance of the training digital object to the training request.

* * * * *